(12) United States Patent
Varga et al.

(10) Patent No.: US 10,459,092 B2
(45) Date of Patent: Oct. 29, 2019

(54) MUOGRAPHIC OBSERVATION INSTRUMENT

(71) Applicant: Wigner Research Center For Physics Of The Hungarian Academy Of Science, Budapest (HU)

(72) Inventors: Dezso Varga, Budapest (HU); Laszlo Olah, Budapest (HU); Gergo Hamar, Budapest (HU); Hiroyuki Tanaka, Tokyo (JP); Tarou Kusagaya, Tokyo (JP)

(73) Assignee: Wagner Research Center for Physics of the Hungarian Academy of Science, Budapest (HU)

( * ) Notice: Subject to any disclaimer, the term of this patent is extended or adjusted under 35 U.S.C. 154(b) by 0 days.

(21) Appl. No.: 16/170,659

(22) Filed: Oct. 25, 2018

(65) Prior Publication Data
US 2019/0064374 A1   Feb. 28, 2019

Related U.S. Application Data

(63) Continuation of application No. PCT/IB2017/052303, filed on Apr. 21, 2017.

(30) Foreign Application Priority Data

Apr. 25, 2016   (JP) .................................. 2016-087436

(51) Int. Cl.
*G01T 1/29*   (2006.01)
(52) U.S. Cl.
CPC .................. *G01T 1/2935* (2013.01)

(58) Field of Classification Search
CPC .................................................... G01T 1/2935
(Continued)

(56) References Cited

U.S. PATENT DOCUMENTS

| 2010/0065745 A1* | 3/2010 | Goldberg | G01T 1/2935 |
|---|---|---|---|
| | | | 250/358.1 |
| 2011/0216945 A1* | 9/2011 | Jaenisch | G01V 5/0008 |
| | | | 382/104 |

(Continued)

OTHER PUBLICATIONS

Perry et al., Imaging a nuclear reactor using cosmic ray muons, 2013, Journal of Applied Physics 113, 184909 (2013); doi: 10.1063/1.4804660 (Year: 2013).*

(Continued)

*Primary Examiner* — David P Porta
*Assistant Examiner* — Gisselle M Gutierrez
(74) *Attorney, Agent, or Firm* — Allen Dyer Doppelt & Gilchrist (57) ABSTRACT

A muographic observation instrument is constructed with a ground unit in which six gaseous detectors are attached to six detector sockets arranged to be parallel to a flat surface with a certain distance between them, and a pair out of ten radiation shields is placed between each detector socket mounted the shield sockets. Since the gaseous detectors have smaller spatial resolution compared to a usual scintillator detector, the thickness of lead plates used for eliminating the noise caused by electromagnetic shower from the horizontal direction can be made ⅕ smaller, and therefore the weight of the whole device is decreased substantially. Furthermore, since only the gaseous detectors and radiation shields have to be mounted to the sockets of the ground unit, the installation of the device is simple.

8 Claims, 5 Drawing Sheets

(58) Field of Classification Search
USPC .................................................... 250/385.1
See application file for complete search history.

(56) References Cited

U.S. PATENT DOCUMENTS

| | | | | |
|---|---|---|---|---|
| 2012/0312985 | A1* | 12/2012 | Morris | G01N 23/20 250/306 |
| 2013/0046127 | A1* | 2/2013 | Nagamine | G01T 1/29 600/1 |
| 2014/0306117 | A1* | 10/2014 | Vacheret | G01T 3/06 250/366 |
| 2014/0319365 | A1* | 10/2014 | Sossong | G01V 5/0016 250/394 |
| 2015/0241593 | A1* | 8/2015 | Blanpied | G01V 5/0016 250/307 |
| 2016/0170072 | A1* | 6/2016 | Yaish | G01V 5/0008 702/179 |

OTHER PUBLICATIONS

Nishiyama et al., Application of Emulsion Cloud Chamber to cosmic-ray muon radiography, 2015, Radiation Measuremens 83 (2015) 56-58 (Year: 2015).*

* cited by examiner

MUOGRAPHIC OBSERVATION INSTRUMENT

CROSS-REFERENCE TO RELATED APPLICATIONS

This application is a continuation of PCT International Patent Application Serial No. PCT/IB2017/052303 filed on Apr. 21, 2017, which claims the benefit of Japanese Patent Application Serial No. JP2016-087436 filed on Apr. 25, 2016, the contents of which applications are herein incorporated by reference in their entirety.

FIELD OF THE INVENTION

The present invention relates to a muographic observation instrument (MOI) for use in a muographic observation system (MOS) that can take an inner image of gigantic objects.

BACKGROUND OF THE INVENTION

A conventional muographic observation instrument (MOI) takes the form of a number of orthogonally arranged muon counters. Each muon counter includes photomultipliers attached to the longitudinal edge of the square columned scintillator bar (for example, see JP 2013-156099). When a muon passes through the counter, photons are generated inside the scintillator, which are eventually converted to electrons by the photomultipliers and further amplified to an output signal with large amplitude. Depending on the position of the muon counter outputting the signal, the position of the incident muon can be identified in the muon counter, which is further used to identify the direction of the incident muon as well in the two-scintillator configuration.

SUMMARY OF THE INVENTION

The electromagnetic shower that consists of electrons, positrons and gamma rays from the sky causes simultaneous detection at two points of a muographic observation instrument (MOI), and these events generate a fake muon signal as if these occurred along a straight line connecting the two detection points. In order to reduce the probability of such incorrect muon signals caused by multiple particles of the electromagnetic shower detected at the same time and along a straight line, multiple muon detectors are placed in a sequence with a set distance between them, and only an event at which all detectors output signals occurring at the same time and along a straight line is considered to be the detection of a muon; this requires a large-sized, heavy weight device. In addition, although the noise caused by the electromagnetic shower from the vertical direction can be effectively eliminated with this multiple muon detector arrangement, noise of the same kind from the horizontal direction remains substantial. Thus, the elimination of noise from the horizontal direction caused by the electromagnetic shower should also be solved. Furthermore, since both the size and the weight of such a muon detector is large, simple installation of the device is also problematic. Since the intention is to use the MOI for the observation of gigantic objects such as mountains, this makes working conditions and accessing the installation place difficult, and therefore implementing simple installation methods for the device and lightening the device weight might be very important issues.

The main purpose of the present invention is to propose a muon detector device which is more effective against noise, has lighter weight, and can be installed easier.

In order to achieve the above mentioned main purposes for the newly invented MOI, the following means have been employed.

The newly invented muon detector is used in a muographic observation system (MOS) that can have the inner image of a gigantic object with the arrangement of:

muon-detecting gaseous detectors that are attached to wires, and arranged to be parallel to a flat surface with a certain distance between them;

radiation shields composed of lead plates placed in stainless steel cases;

detachable detector sockets mounting the gaseous detectors; and detachable shield sockets placed between the detector sockets that mount the radiation shields.

The newly invented MOI includes multiple muon-detecting gaseous detectors that are connected to wires and arranged parallel to a flat surface at regular intervals, radiation shields that are composed of stainless still case housings and lead plates, detachable detector sockets for each gaseous detector, and detachable shield sockets for each radiation shield. The gaseous detector has $1/10$ smaller spatial resolution in comparison to a general scintillator. For this reason, a thickness of the radiation shield lead plates that are necessary for eliminating the noise during the muon detection caused by electromagnetic shower that consists of electrons, positrons and gamma rays can be reduced to less than $1/5$ of the original thickness. Furthermore, the gaseous detector is lighter than the scintillator detector. As a result of these, the MOI maintains the same degree of performance as the scintillation detector while also being less heavy and easier to install, which improves the observation conditions. Moreover, the parallel arrangement of the gaseous detectors mounted to the detector sockets (which are placed in regular intervals in the ground unit) allows us to eliminate the noise caused by the electromagnetic shower from the sky. Furthermore, by mounting each radiation shield to the shield sockets, the noise caused by the electromagnetic shower from horizontal direction can be removed as well. As a result, the muon detector is more light weight and more effective against noise.

The newly invented MOI with multiple radiation shields and shield sockets between each detector socket allows for simple installation of the device.

In the newly invented MOI, the detector sockets and shield sockets can be lifted up and down. In this way, the gaseous detectors connected to the detector sockets and the radiation shields connected to the shield sockets are easily detachable. This allows for easy and quick installation of the device.

Furthermore, the newly invented MOI is composed of elements which can be disassembled freely. In this way, even if the access of the installation place is difficult, by decomposing the device it can be easily carried to the installation place. As a result, the installation of the device becomes easy.

DETAILED DESCRIPTION OF THE PREFERRED EMBODIMENTS

Next a description of the implementation of the present invention will be given by presenting explicit examples.

Figure 1:
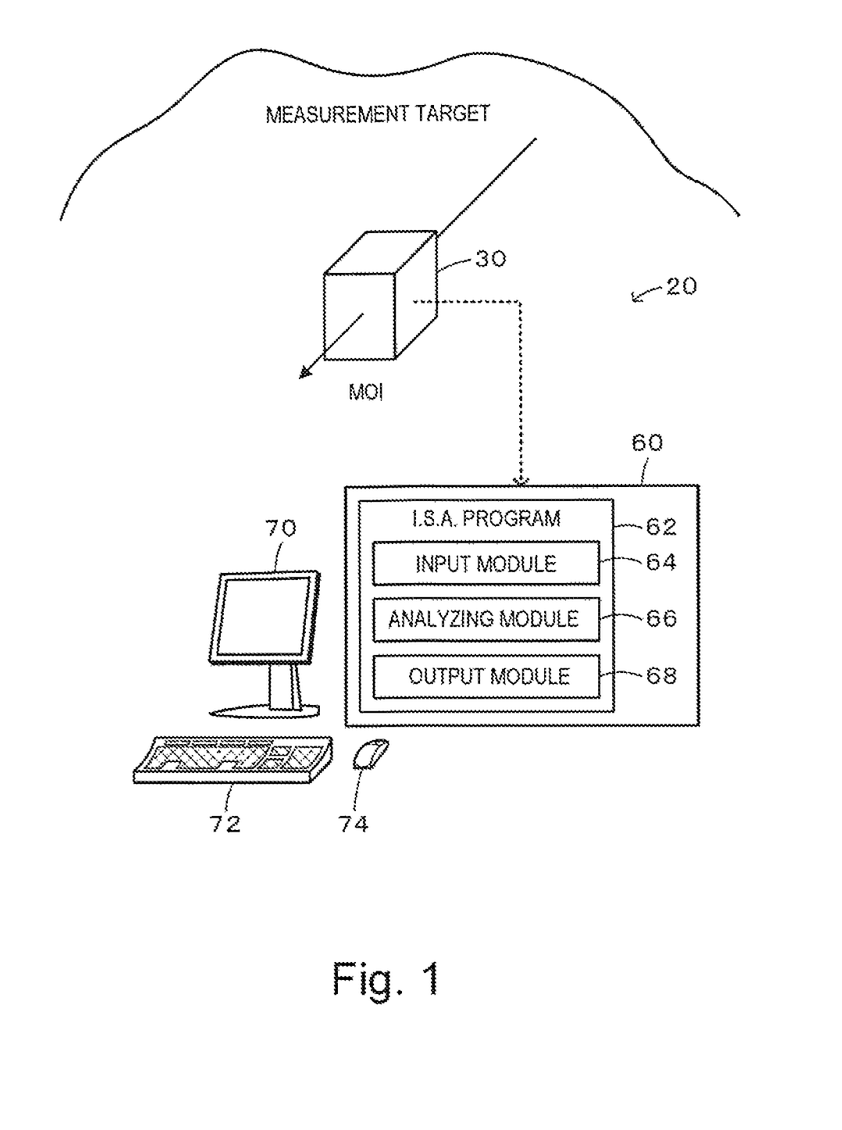
FIG. 1 shows a structure of the newly invented muographic observation system (MOS) using the muographic observation instrument (MOI).

FIG. 1 shows the structure of the muographic observation system (MOS) 20 that uses the newly invented muographic observation instrument (MOI) 30. The MOS 20 is placed around gigantic objects such as mountains and by detecting the muons that have passed through the object, and then processing the detection results with the analyzer 60, an image of its interior is generated. As shown in FIG. 1, the analyzing system 60 contains an internal structure analyzer (ISA) program 62 which is software running on a general-purpose computer. The computer has CPU, ROM, RAM, GPU, VRAM, and HDD not shown in the Figure, as well as the ISA program 62 installed on the hard disc drive. The ISA program 62 has a data-input module 64, an analyzing module 66 which checks the input data for the interior part of the target object, and an output module 68 that provides the results of the analyzing module. A monitor 70, keyboard 72, and a mouse 74 are attached to the computer. Since the ISA program 62 uses basically the same method as described in the given literature mentioned in the background part of this document, detailed description of the program is omitted here.

Figure 2:
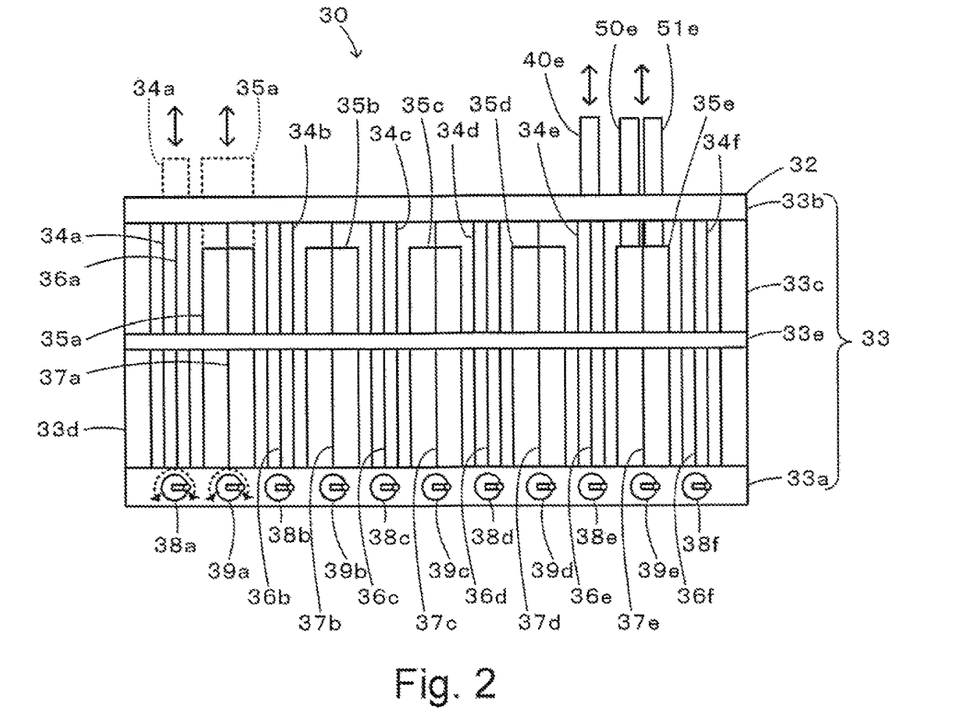
FIG. 2 shows a construction of the MOI.
Figure 3:
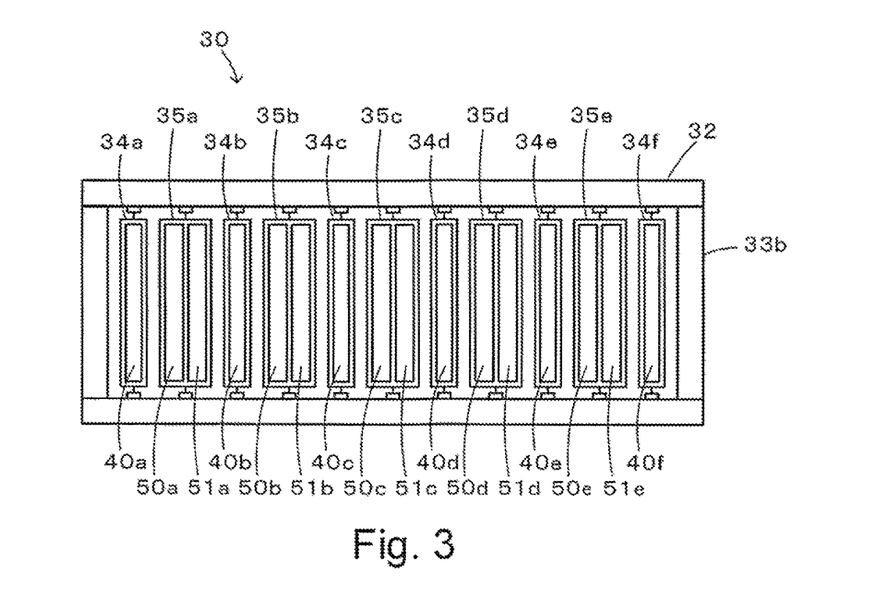
FIG. 3 shows a view of the construction shown in FIG. 2 from above.

FIG. 2 shows the construction of the MOI 30. FIG. 3 is a view of the construction shown in FIG. 2 from above. The MOI 30, as shown in FIG. 2, has 6 gaseous detectors 40a-40f and 10 radiation shields 50a-50e, 51a-51f as a part of the ground unit 32. Since the 6 gaseous detectors are identical, it is referred to and denoted as gaseous detector 40 in the Figure. Also, the 10 radiation shields are identical, so they are referred to as radiation shield 50, 51.

The ground unit 32 has a supporting frame 33, 6 detector sockets 34a-34f for inserting the 6 gaseous detectors 40a-40f, 5 shield sockets 35a-35e for inserting the 10 radiation shields 50a-50e, 51a-51f. Each detector socket 34a-34f can be raised or lowered by the lifting handles 38a-38f, and similarly the shield sockets 35a-35e are also liftable by the lifting handles 39a-39e. The lifting of the detector socket 34a and the shield socket 35a is shown by broken lines in the upper left part of FIG. 2, while the upper right part of the Figure shows the lifting of the gaseous detector 40e and radiation shield 50e, 51e through the sockets 34e, 35e.

The supporting frame 33 made of stainless steel includes the lower frame part 33a, upper frame part 33b, side parts 33c, 33d, and reinforcement part 33e. The 6 detector sockets 34a-34f are arranged to be parallel to a flat surface with equal intervals, and the 5 shield sockets 35a-35e are placed between them with the same arrangement, i.e. in equal intervals. The arrangement of the detector sockets and shield sockets are alternatively repeated in the following order: detector socket 34a, shield socket 35a, detector socket 34b, shield socket 35b, and so on. Therefore, between each of the neighboring gaseous detectors 40 2 radiation shields are inserted.

The lifting handles 38a-38f are connected to the detector sockets 34a-34f through the wires 36a-36f, and turning them clockwise or anti-clockwise the wires 36a-36f can be wound up or released, and as a result, the detector sockets 34a-34f can be lifted up or down separately. Similarly, the lifting handles 39a-39e are connected to the shield sockets 35a-35e through the wires 37a-37e, and are used in the same way to lift the shield sockets 35a-35e separately.

Figure 4:
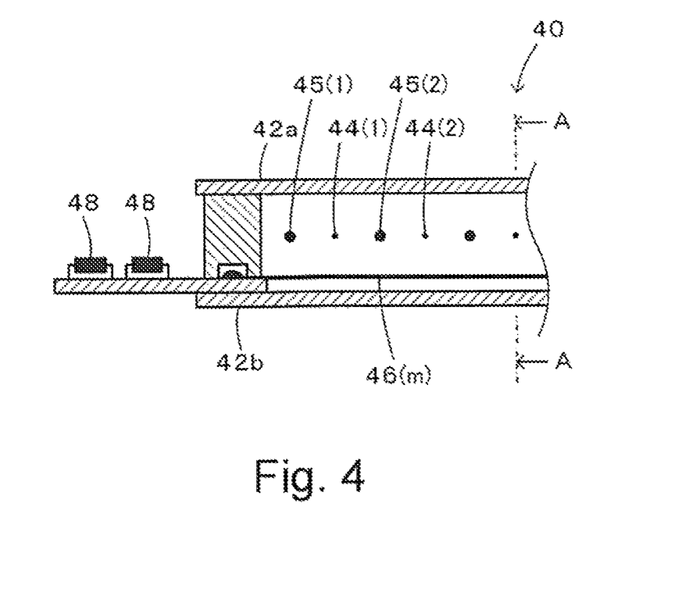
FIG. 4 shows a schematic representation of an inside part of a gaseous detector.
Figure 5:
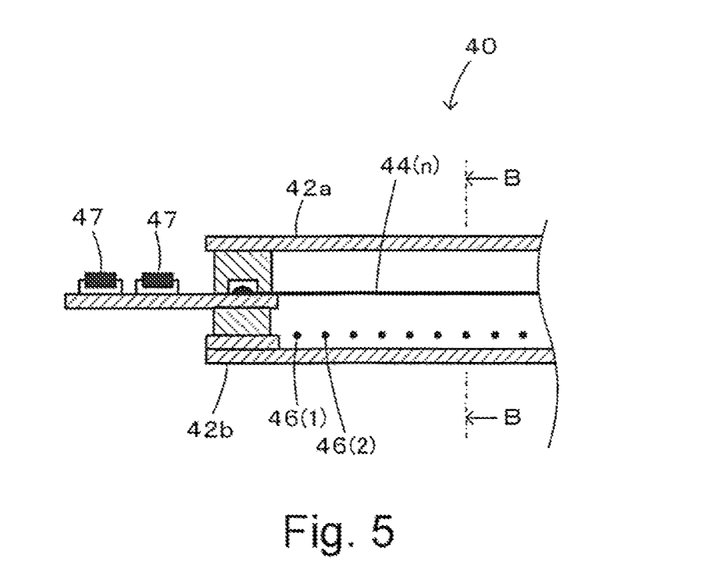
FIG. 5 shows a cross sectional view of the plane A-A of FIG. 4.

FIG. 4 is a schematic representation of the inside part of the gaseous detector 40 while FIG. 5 is a cross sectional view of the plane A-A of FIG. 4. Thereby, FIG. 4 is a cross sectional view of the plane B-B of FIG. 5. The gaseous detector 40 includes a known gas-wire chamber (MWPC: Multi Wire Proportional Chamber), two cathode planes 42a, 42b with anode wires 44(1) ... 44(n) in their middle part arranged parallel to each other at regular intervals with field wires 45(1) ... 45(n) put between the anode wires. In the vicinity of the cathode plane 42b a set of signal pick-up wires 46(1) ... 46(m) are arranged orthogonal to the anode wires 44(1) ... 44(n), and they are connected to the signal read-out part 48, while the field wires 45(1) ... 45(n) are connected to the read-out part 47. In this way, the detection of two directions (x and y) is possible in a single signal. The inner part of the gaseous detector is filled with a mixture of Ar and $CO_2$ gases which is non-flammable and non-toxic. As an example, the diameter of the anode wires 44(1) ... 44(n) is 25 micrometers while the diameter of the field wires 45(1) ... 45(n) is 100 micrometers, their length is 1500 mm, and the distance between them is 12 mm. Finally, the diameter of the signal pick-up wires is 100 micrometers and their length is 1500 mm. Therefore, the size of the gaseous detector 40 is about 1550 mm×1550 mm×25 mm.

Figure 6:
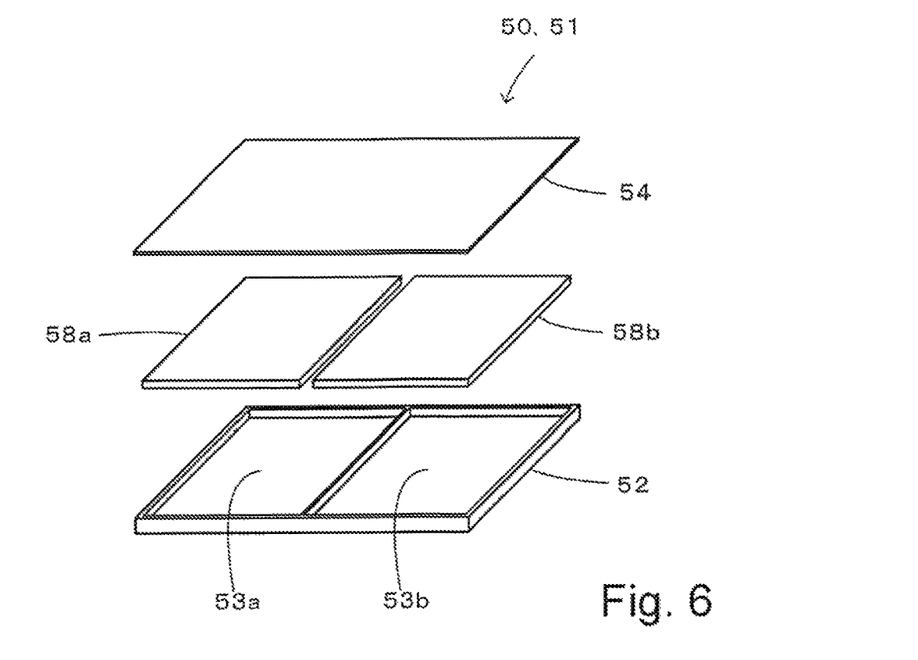
FIG. 6 shows a construction of the radiation shields.

FIG. 6 shows the construction of the radiation shields 50, 51. Each radiation shield 50, 51 includes the bottom frame 52 made of stainless steel, the cover frame 54 made of stainless steel, where the bottom frame 52 has two rectangular flat frames 53a, 53b in which two lead plates 58a, 58b are placed. As an example for the radiation shield 50, 51, the frames 53a, 53b with a length of 1500 mm and a width of 750 mm made of 10 mm thick stainless steel SUS304 build up the bottom frame 52 in which the frames 58a, 58b with length 1500 mm, width 750 mm, and thickness 50 mm are put, and the cover frame 54 has length 1520 mm and width 1530 mm, and it is also made of 10 mm thick stainless steel SUS304. In this arrangement lead plates are put inside the stainless steel case, and since the lead is soft, it is difficult to maintain its shape under its own weight.

The 6 gaseous detectors 40a-40f of the MOI 30 are mounted by the 6 detector sockets 34a-34f and arranged in regular intervals to be parallel to a flat surface. Multiple detectors effectively reduce the possibility of fake track generation due to the accidental coincidence of shower particles in the MOI. The muon tracks can be identified by connecting the vertex points generated on these gaseous detectors 40 arranged to be parallel to the flat surface. This noise reduction rate is more improved if we increase the number of detectors used for reconstructing the muon tracks because the shower particles hit each gaseous detector 40a-40f randomly and as a result, it is unlikely that those other than muon events will create a linear trajectories with more vertex points.

In the MOI 30, out of the 10 radiation shields 50a-50e, 51a-51e that are mounted to the shield sockets 35a-35e, a pair is placed between each parallel detector socket 34a-34f.

Figure 7:
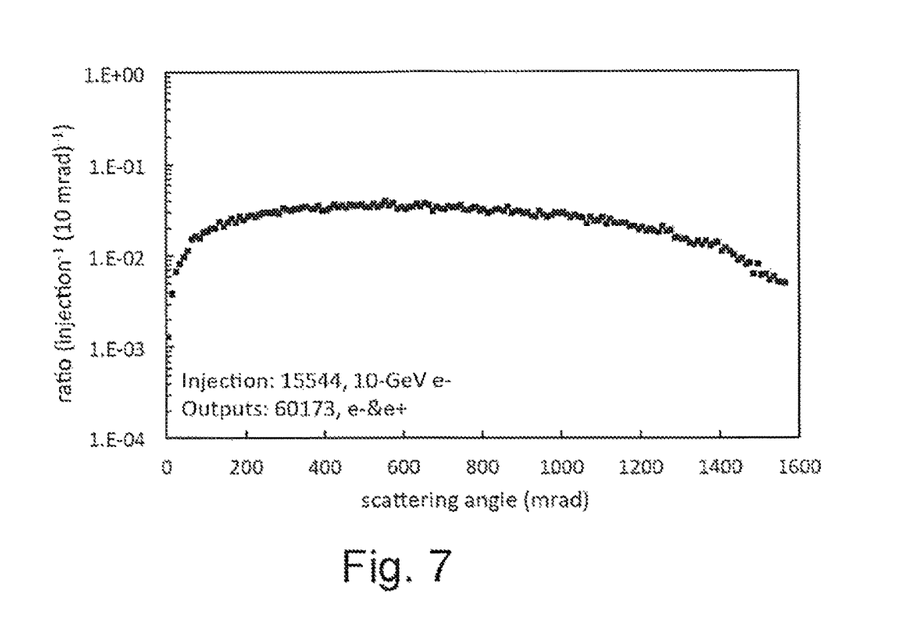
FIG. 7 shows scattering of the high-energy electrons by the radiation shields.

Therefore, the noise caused by the electromagnetic shower coming from the horizontal direction is eliminated in this way. Since the muon is strong enough to penetrate many of the radiation shields 50a-50e, 51a-51e this does not affect the detection of the straight track of muons. However, in contrast to muons, the electromagnetic and hadronic particles, mainly electrons, positrons, gamma rays, protons and mesons, have a lower power of penetration and therefore they are terminated or scattered by the radiation shields 50a-50e, 51a-51e. FIG. 7 shows the scattering of high-energy electrons by the radiation shields 50, 51 as an example. As described above, one of the main components of the electromagnetic particle is electrons. When vertex points are identified at all of the 6 gaseous detectors 40a-40f with a slight time difference and along a straight line, these are identified as muon events; the electromagnetic shower is identified if they are not detected along a straight line.

Figure 8:
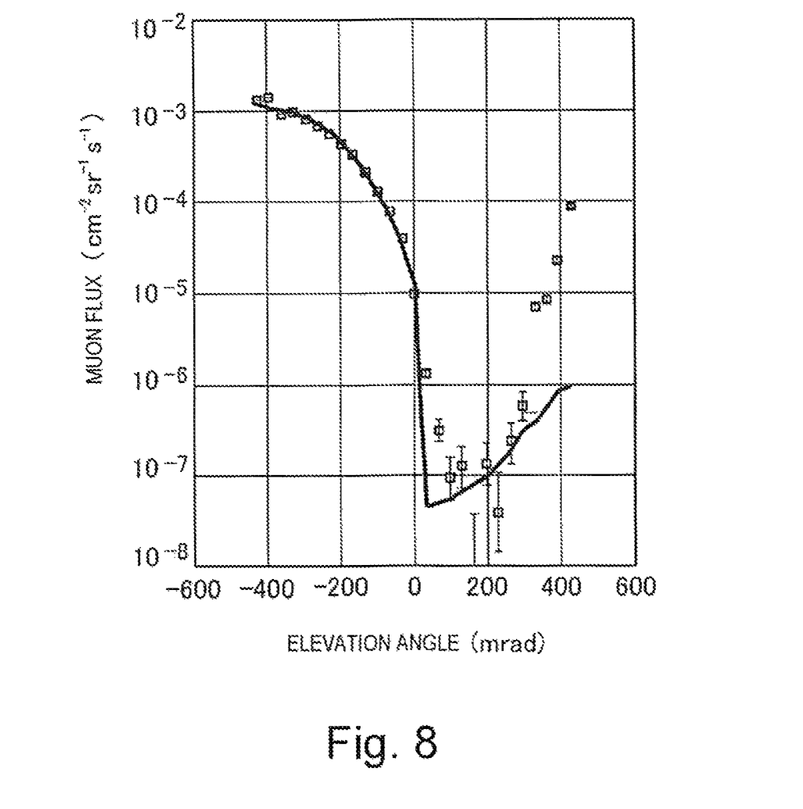
FIG. 8 shows a comparison of the muon flux measured by the muon detector with the theoretical result as a function of the angle of elevation.

FIG. 8 is a comparison of the muon flux measured by the MOS 20 with the theoretical result as a function of the elevation angle. The solid line in the figure shows the theoretically calculated muon flux. The thickness of the mountain is thin in the range of high elevations, and becomes thicker as the elevation angle is decreased. For the elevation-angle values near the zero value at the right-hand side, the maximum thickness of mountain is 2500 m. On the other hand, in the negative side of the value of zero elevation angle there is no mountain, and therefore its thickness vanishes. Thus, the theoretical muon flux is the 'open-sky' distribution in the negative elevation-angle range, while in the positive elevation-angle range it depends on the thickness of the mountain. In the negative elevation-angle range the muon flux observed by the MOS 20 matches with the 'open-sky' theoretical result, which shows that the noise is removed reasonably. For elevation values larger than 300 mrad the observed flux values are much larger compared to the theoretical result, which indicates the presence of holes in the mountain caused by foaming magma and paths of magma. For elevation less than 100 mrad the measured flux is slightly larger than the theoretical expectation, which is thought to be caused by the scattering of muons. As a conclusion, the fake muon tracks were removed reasonably.

Next, the performance of the MOI 30 is discussed by comparing with the conventional MOI using plastic scintillator bars. Plastic scintillator bars are heavier than the gaseous detector 40 for the same active area. Considering a 1500 mm×1500 mm sensor area, it gives 800 kg for the weight of the plastic scintillator against the 200 kg weight for the gaseous detector. Furthermore, the spatial resolution of the scintillator detector is 100 mm, while it is 10 mm for the gaseous detector. Therefore, in case of the scintillator detector five times thicker lead plates are necessary to exclude the noise caused by the electromagnetic shower from the horizontal direction. Considering the lead density as 11.34 g/cm$^3$, the weight of a pair of radiation shields 50, 51 mounted to the shield sockets 35a-35e in the present muon detector case is 1500 mm×1500 mm×100 mm×11.3 g/cm$^3$=2.55 t which should be compared to the weight 1500 mm×1500 mm×500 mm×11.34 g/cm$^3$=12.75 t for the case of the scintillator detector. Therefore, the total weight of the 10 radiation shields 50a-50e, 51a-51e is 2.55 t for the gaseous detector, which should be compared to the weight 12.75 t for the case of the scintillator detector.

The ground unit 32 of the above described muon detector 30 contains 6 gaseous detectors 40a-40f, 10 radiation shields 50a-50e, 51a-51e, 6 detector sockets 34a-34f, and 5 shield sockets 35a-35e. Because each gaseous detector 40a-40f has 10 times smaller spatial resolution compared to a general scintillator detector, the thickness of the radiation shields 50a-50e, 51a-51e necessary for removing the noise caused by electromagnetic shower mainly charged electrons e−,e+ during the muon detection is ⅕ smaller in the case of the present muon detector case. In addition, the weight of a gaseous detector 40 is ¼ smaller than a scintillator detector assuming the same sensor area. As a result, the present muon detector having the same performance as compared to a general detector device using a scintillator detector can be made at least five times lighter. Furthermore, due to the structure of the ground unit 32 in the present device containing 6 gaseous detectors 40a-40f mounted by the detector sockets 34a-34f, the noise caused by the electromagnetic shower from the sky can be efficiently eliminated. In addition, the structure of the ground unit 32 with pairs of the 10 radiation shields 50a-50e, 51a-51e mounted by the 5 shield sockets 35a-35e also allows for the elimination of the noise caused by the electromagnetic shower from the horizontal direction. Thus, the present muon detector 30 is lighter, more efficient against noise, and can be installed easier compared to a general scintillator detector.

Since the 6 detector sockets 34a-34f, the 5 shield sockets 35a-35e, and the heavy radiation shields 50a-50e, 51a-51e of the present muon detector 30 can be disassembled freely, the installation of the present device is easy. Furthermore, since the detector sockets 34a-34f and the shield sockets 35a-35e can be lifted up and down individually using the lifting handles 38a-38f, 39a-39e by turning them clockwise or anti-clockwise, the detachment of the gaseous detectors 40a-40f from the detector sockets 34a-34f and the detachment of the radiation shields 50a-50e, 51a-51e from the shield sockets 35a-35e is easy, which makes the installation process of the observation device simple. Besides, concerning the support frame 33 of the ground unit 32, since it can be removed and assembled freely, even when the access of the installation place is difficult, the support frame 33 can be carried there in a disassembled state. As a result, the installation of the device is simple.

Concerning the 6 gaseous detectors 40a-40e arranged to be parallel to a flat surface with regular intervals between them, the parallel arrangement is important but the details of the intervals between them are not. Moreover, the number of the gaseous detectors is not limited to 6, it can be more (e.g., 7) or less (e.g., 5).

In the present configuration, a pair out of the 10 radiation shields 50a-50e, 51a-51e is placed between each gaseous detector 40a-40e, but it is also possible to put more than 3 radiation shields between the gaseous detectors instead of a pair. Not placing radiation shields between each gaseous detector is also possible.

In the MOI 30 the radiation shield 50,51 is constituted from two housing frames 53a, 53b in which the lead plates 58a, 58b are put, but it is also possible to use three or more housing frames and lead plates. In the MOI 30, the stainless cases are housing the lead plates, but other materials with strength such as iron can also be used.

In the MOI 30 the detector sockets 34a-34f and the shield sockets 35a-35e can be individually lifted, but if not, it does not matter.

The implementation of the present invention is described here by giving concrete examples, but the invention is not limited only to these examples, it can be implemented in various ways.

INDUSTRIAL APPLICABILITY

The present invention can be used in manufacturing industry of muon detectors.

LIST OF REFERENCE NUMBERS

20: MOS
30: MOI
32: ground unit
33: support frame
34a-34f: detector sockets
35a-35e: shield sockets
36a-36f, 37a-37e: wires
38a-38f, 39a-39e: lifting handles
40, 40a-40f: gaseous detectors
42a, 42b, 42c: cathode planes
44(1) . . . 44(n): anode wires
45(1) . . . 45(n): field wires;
48: signal read-out
50,51, 50a-50e, 51a-51e: radiation shields
52: bottom frame
53a, 53b: frames
54 cover frame
58a, 58b: lead plates
60: analyzer
62: internal state analyzer (ISA) program
64: input module
66: analyzing module
68: output module
70: monitor
72: keyboard
74: mouse Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A muographic observation instrument for use in a muographic observation system for imaging an internal structure of a gigantic object, the muographic observation instrument comprising an arrangement of:
    muon-detecting gaseous detectors attached to wires arranged to be parallel to a flat surface with a certain distance between them;
    radiation shields composed of lead plates placed in stainless steel cases;
    detachable detector sockets mounting the gaseous detectors; and
    detachable shield sockets placed between the detector sockets that mount the radiation shields.

2. The muographic observation instrument of claim 1, wherein the radiation shields include multiple radiation shields attached to the shield sockets which are placed between the detector sockets.

3. The muographic observation instrument of claim 2, wherein the detector sockets and shield sockets are liftable.

4. The muographic observation instrument of claim 3, wherein the muographic observation instrument is composed of parts that can be easily and freely disassembled.

5. The muographic observation instrument of claim 2, wherein the muographic observation instrument is composed of parts that can be easily and freely disassembled.

6. The muographic observation instrument of claim 1, wherein the detector sockets and shield sockets are liftable.

7. The muographic observation instrument of claim 6, wherein the muographic observation instrument is composed of parts that can be easily and freely disassembled.

8. The muographic observation instrument of claim 1, wherein the muographic observation instrument is composed of parts that can be easily and freely disassembled.

* * * * *